United States Patent
Kwon

(10) Patent No.: US 9,527,509 B2
(45) Date of Patent: Dec. 27, 2016

(54) DRIVER CONVENIENCE SYSTEM AND METHOD FOR DETERMINING VERTICAL ANGLE ABNORMALITY OF RADAR THEREIN

(71) Applicant: MANDO CORPORATION, Pyeongtaek-si, Gyeonggi-do (KR)

(72) Inventor: Min Su Kwon, Anyang-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/697,994

(22) Filed: Apr. 28, 2015

(65) Prior Publication Data

US 2015/0314785 A1    Nov. 5, 2015

(30) Foreign Application Priority Data

Apr. 30, 2014    (KR) .................. 10-2014-0052296

(51) Int. Cl.
| | |
|---|---|
| *G01C 22/00* | (2006.01) |
| *G05D 1/00* | (2006.01) |
| *B60W 30/16* | (2012.01) |
| *G01S 13/66* | (2006.01) |
| *G01S 13/88* | (2006.01) |

(Continued)

(52) U.S. Cl.
CPC ............. *B60W 30/16* (2013.01); *B60K 35/00* (2013.01); *B60Q 9/00* (2013.01); *B60W 50/02* (2013.01); *G01S 7/4026* (2013.01); *G01S 13/52* (2013.01); *G01S 13/66* (2013.01); *G01S 13/88* (2013.01); *G01S 13/931* (2013.01); *B60W 2550/10* (2013.01); *G01S 13/726* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 6,020,844 | A | * | 2/2000 | Bai .................. G01S 7/4026 342/147 |
| 6,026,353 | A | * | 2/2000 | Winner ............. G01S 7/4026 342/70 |

(Continued)

FOREIGN PATENT DOCUMENTS

| | | |
|---|---|---|
| KR | 1020090065187 A | 6/2009 |
| KR | 1020130000202 A | 1/2013 |

*Primary Examiner* — Bhavesh V Amin
(74) *Attorney, Agent, or Firm* — Hauptman Ham, LLP

(57) ABSTRACT

A driver convenience system for determining a vertical angle abnormality of a radar includes: a radar which is mounted on a vehicle to detect vehicle-ahead information; and an electronic control unit which controls driving of the vehicle based on the vehicle-ahead information detected by the radar. The electronic control unit includes: a monitoring unit configured to monitor a stationary object based on the vehicle-ahead information detected by the radar; an updating unit configured to update a maximum detection distance between the stationary object monitored by the monitoring unit and the vehicle; a vertical angle estimating unit configured to estimate a vertical angle of the radar by using the maximum detection distance updated by the updating unit; and a determining unit configured to determine that a vertical angle abnormality occurs in the radar when the estimated vertical angle is out of a preset required mount angle.

9 Claims, 3 Drawing Sheets

(51) Int. Cl.
*B60Q 9/00* (2006.01)
*B60K 35/00* (2006.01)
*B60W 50/02* (2012.01)
*G01S 7/40* (2006.01)
*G01S 13/52* (2006.01)
*G01S 13/93* (2006.01)
*G01S 13/72* (2006.01)

(52) U.S. Cl.
CPC .............. *G01S 2007/4034* (2013.01); *G01S 2013/9353* (2013.01); *G01S 2013/9375* (2013.01)

(56) References Cited

U.S. PATENT DOCUMENTS

| | | | | |
|---|---|---|---|---|
| 6,246,949 B1* | 6/2001 | Shirai | ............... | B60K 31/0008 342/70 |
| 6,329,952 B1* | 12/2001 | Grace | ............... | G01S 7/4017 340/903 |
| 6,437,731 B1* | 8/2002 | Henrio | ............... | G01S 7/4026 342/165 |
| 6,636,172 B1* | 10/2003 | Prestl | ............... | G01S 7/4026 342/173 |
| 6,828,931 B2* | 12/2004 | Kikuchi | ............... | G01S 7/4026 342/174 |
| 6,896,082 B2* | 5/2005 | Asanuma | ............... | G01S 7/4026 180/169 |
| 7,221,310 B2* | 5/2007 | Nakagawa | ............... | G01S 7/4026 342/118 |
| 8,212,714 B1* | 7/2012 | Doerry | ............... | G01S 7/40 342/165 |
| 8,344,940 B2* | 1/2013 | Jeong | ............... | G01S 7/4026 342/173 |
| 8,711,031 B2* | 4/2014 | Jeong | ............... | G01S 13/931 342/70 |
| 2002/0189875 A1* | 12/2002 | Asanuma | ............... | G01S 7/4026 180/169 |
| 2003/0122704 A1* | 7/2003 | Dubrovin | ............... | G01S 17/936 342/70 |
| 2004/0117090 A1* | 6/2004 | Samukawa | ............... | B60K 31/0008 701/45 |
| 2005/0285778 A1* | 12/2005 | Shinagawa | ............... | G01S 7/4026 342/173 |
| 2007/0055446 A1* | 3/2007 | Schiffmann | ............... | G01S 7/4026 701/301 |
| 2010/0097264 A1* | 4/2010 | Kawasaki | ............... | H01Q 1/42 342/70 |
| 2011/0068970 A1* | 3/2011 | Mitsumoto | ............... | G01S 7/4026 342/70 |
| 2012/0257792 A1* | 10/2012 | Simon | ............... | G01C 11/06 382/103 |

\* cited by examiner

DRIVER CONVENIENCE SYSTEM AND METHOD FOR DETERMINING VERTICAL ANGLE ABNORMALITY OF RADAR THEREIN

CROSS-REFERENCE(S) TO RELATED APPLICATION

This application claims priority of Korean Patent Application No. 10-2014-0052296, filed on Apr. 30, 2014, in the Korean Intellectual Property Office, which is hereby incorporated by reference in its entirety.

BACKGROUND OF THE INVENTION

Field of the Invention

The present invention relates to a driver convenience system and a method for determining a vertical angle abnormality of a radar in the driver convenience system, and more particularly, to a driver convenience system and a method for determining a vertical angle abnormality of a radar in the driver convenience system, which determines whether a vertical angle abnormality occurs in a radar by using a preset required mount angle range and a vertical angle estimated based on a maximum detection distance between a vehicle and a stationary object in vehicle-ahead information acquired by performing monitoring ahead of the vehicle from the radar.

Description of the Related Art

Recently, more vehicles have been equipped with a radar. An electronic control unit for a vehicle can calculate a distance, a relative speed, and an angle between a host vehicle and an object around the host vehicle, based on information output from a radar mounted on the host vehicle.

The vehicle equipped with the radar may provide various safety functions or convenient functions by using the distance, the relative speed, and the angle between the host vehicle and the object around the host vehicle.

For example, a driver convenience system may implement a collision avoidance function, an adaptive cruise function, or the like, by measuring a distance, a relative speed, and an angle between a host vehicle and an object adjacent to the host vehicle, based on information received from a radar mounted on the host vehicle.

Since the radar mounted on the host vehicle plays an important role in implementing various functions, the reliability of the information received from the radar is also important.

Since the radar is mounted on the vehicle, various shocks may be applied to the radar during the traveling of the vehicle or due to several causes. Thus, the radar may be deviated from an original mount position.

When the radar is deviated from the original mount position, the accuracy of the detection values may be lowered. Thus, various methods have been used to recognize or compensate for the inaccuracy of the detection values by using detected information. When a problem occurs in a vertical angle of the radar, it is difficult to detect a vertical angle abnormality by just using vehicle-ahead information detected by the radar during the traveling of the vehicle.

In particular, since the radar having the vertical angle abnormality is directed not frontward but downward or upward, the radar may recognize an inaccurate front distance. In this case, the radar may detect vehicles ahead late or may not detect vehicles ahead, and an existing driver convenience system may cause quick braking or collision accidents accordingly.

In addition, the vertical angle abnormality of the radar can be detected by mounting an additional sensor, but most vehicles are not equipped with the additional sensor because of an increase in costs due to the addition of the sensor.

Therefore, there is a need for an improved driver convenience system capable of determining whether a vertical angle abnormality occurs in a radar without installing separate additional sensors therein.

CITATION LIST

Patent Literature (Patent Literature 1) Korean Patent Application Publication No. 10-2009-0065187 (Jun. 22, 2009) entitled "RADAR APPARATUS AND METHOD FOR CORRECTING EMISSION AXIS THEREOF"

(Patent Literature 1) Korean Patent Application Publication No. 10-2013-0000202 (Feb. 2, 2013) entitled "SYSTEM FOR CORRECTING MISALIGNMENT OF RADAR MOUNT ANGLE"

SUMMARY OF THE INVENTION

An aspect of the present invention is directed to a driver convenience system and a method for determining a vertical angle abnormality of a radar in the driver convenience system, which determines whether a vertical angle abnormality occurs in a radar by using a preset required mount angle range and a vertical angle estimated based on a maximum detection distance between a vehicle and a stationary object in vehicle-ahead information acquiring by performing monitoring ahead of the vehicle from the radar.

According to an embodiment of the present invention, a driver convenience system includes: a radar which is mounted on a vehicle to detect vehicle-ahead information; and an electronic control unit which controls driving of the vehicle based on the vehicle-ahead information detected by the radar, wherein the electronic control unit includes a monitoring unit configured to monitor a stationary object based on the vehicle-ahead information detected by the radar; an updating unit configured to update a maximum detection distance between the stationary object monitored by the monitoring unit and the vehicle; a vertical angle estimating unit configured to estimate a vertical angle of the radar by using the maximum detection distance updated by the updating unit; and a determining unit configured to determine that a vertical angle abnormality occurs in the radar when the estimated vertical angle is out of a preset required mount angle.

The updating unit may set a sampling interval at which whether the vertical angle abnormality occurs in the radar is determined based on the number of stationary objects, and provide the updated maximum detection distance to the vertical angle estimating unit at the time of arrival of the set sampling interval.

When it is determined that the vertical angle abnormality occurs in the radar, the determining unit may output notification information indicating the vertical angle abnormality through at least one of a speaker mounted on the vehicle, a screen of a terminal mounted on the vehicle, and a cluster.

The vertical angle estimating unit may estimate the vertical angle of the radar by referring to mapping data storing an estimation angle defined with respect to each maximum detection distance.

According to another embodiment of the present invention, a driver convenience system, which includes a radar which is mounted on a vehicle to detect vehicle-ahead information and a control unit which controls autonomous driving of the vehicle based on the vehicle-ahead information detected by the radar, includes a fail-safe unit configured to classify attributes of vehicle-ahead information detected by the radar, update a maximum detection distance between a stationary object and the vehicle, and determine that a vertical angle abnormality occurs in the radar when a vertical angle of the radar which is estimated by using the updated maximum detection distance is out of a preset required mount angle range.

The fail-safe unit may output a vertical angle abnormality signal to the control signal, the vertical angle abnormality signal being generated based on a result of determination that the vertical angle abnormality occurs in the radar.

According to another embodiment of the present invention, a method for determining a vertical angle abnormality of a radar in a driver convenience system, which includes a radar which is mounted on a vehicle to detect vehicle-ahead information and an electronic control unit which controls driving of the vehicle based on the vehicle-ahead information detected by the radar, includes: monitoring a stationary object based on the vehicle-ahead information detected by the radar; updating a maximum detection distance between the monitored stationary object and the vehicle; estimating a vertical angle of the radar by using the updated maximum detection distance; and determining that the vertical angle abnormality occurs in the radar when the estimated vertical angle is out of a preset required mount angle.

The method may further include, after the monitoring of the stationary object, setting a sampling interval at which whether the vertical angle abnormality of the radar occurs in the radar is determined based on the number of stationary objects; and providing the updated maximum detection distance to be used in the estimating of the vertical angle at the time of arrival of the set sampling interval.

According to another embodiment of the present invention, a method for determining a vertical angle abnormality of a radar in a driver convenience system, which includes a radar which is mounted on a vehicle to detect vehicle-ahead information and a control unit which controls driving of the vehicle based on the vehicle-ahead information detected by the radar, includes: classifying attributes of vehicle-ahead information detected by the radar and updating a maximum detection distance between a stationary object and the vehicle; estimating a vertical angle of the radar by using the updated maximum detection distance; and determining that the vertical angle abnormality occurs in the radar when the estimated vertical angle is out of a preset required mount angle.

The method may further include, after the determining of the vertical angle abnormality, outputting a vertical angle abnormality signal generated based on a result of determination that the vertical angle abnormality occurs in the radar to the control unit.

DETAILED DESCRIPTION OF EXEMPLARY EMBODIMENTS

Figure 1:
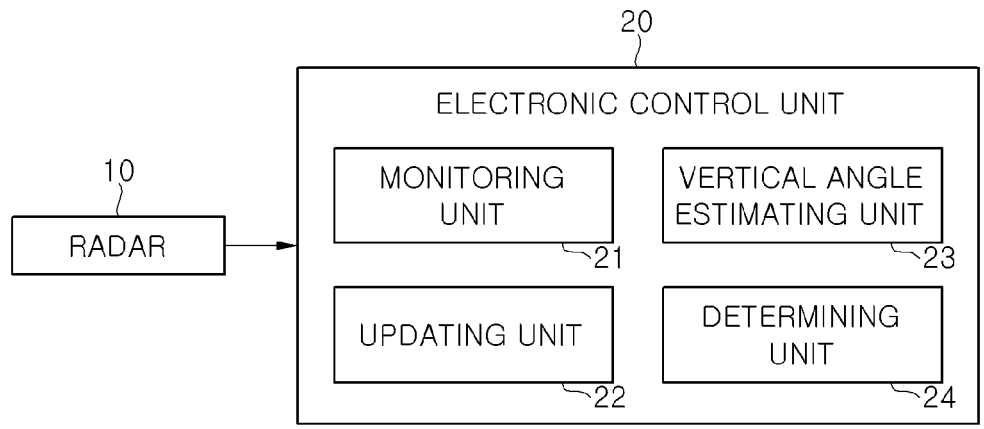
FIG. 1 is a block diagram explaining a driver convenience system according to an embodiment of the present invention.

Exemplary embodiments of the present invention will be described below in detail with reference to the accompanying drawings. Throughout the disclosure, like reference numerals refer to like parts throughout the drawings and embodiments of the present invention.

Hereinafter, exemplary embodiments of the present invention will be described in detail with reference to the accompanying drawings.

FIG. 1 illustrates a block diagram explaining a driver convenience system according to an embodiment of the present invention.

Referring to FIG. 1, the driver convenience system according to the embodiment of the present invention includes a radar 10 and an electronic control unit 20.

The radar 10 measures vehicle-ahead information (track information) corresponding to a relative distance, a relative speed, and an angle between a preceding object and a vehicle, that is, a host vehicle. The radar 10 may measure the vehicle-ahead information with respect to one or more preceding objects. Even when a position or a speed of the host vehicle varies depending on the traveling of the host vehicle, the radar 10 may measure the vehicle-ahead information (track information) of the preceding object by continuously tracking the preceding object.

In this case, an identifier (ID) may be assigned to each preceding object in order to output vehicle-ahead information for the one or more preceding objects.

The vehicle-ahead information detected by the radar 10 is transferred to the electronic control unit 20.

The electronic control unit 20 monitors a stationary object based on the vehicle-ahead information detected by the radar 10 and determines whether a vertical angle abnormality occurs in the radar 10 according to whether an estimation angle that is estimated by using a maximum detection distance between the monitored stationary object and the host vehicle is in a preset required mount angle range.

The electronic control unit 20 includes a monitoring unit 21, an updating unit 22, a vertical angle estimating unit 23, and a determining unit 24.

The monitoring unit 21 monitors the stationary object by classifying attributes of the vehicle-ahead information detected by the radar 10.

The updating unit 22 updates the maximum detection distance between the stationary object monitored by the monitoring unit 21 and the host vehicle. The maximum detection distance is included in the vehicle-ahead information detected by the radar 10. When there are a plurality of stationary objects in the vehicle-ahead information, the updating unit 22 determines the longest one of detection distances for the plurality of stationary objects as the maximum detection distance and performs updating by using the determined maximum detection distance.

In addition, the updating unit 22 sets a sampling interval at which whether the vertical angle abnormality occurs in the radar 10 is determined, and provides the updated maximum detection distance to the vertical angle estimating unit 23 at the time of arrival of the set sampling interval. As described above, it is preferable that the sampling interval is determined based on the number of stationary objects. For example, a sampling interval in a case where there is no stationary object is set to be different from a sampling interval in a case where there are a plurality of stationary objects, thus increasing reliability in the maximum detection distance. When there is no stationary object, it is preferable to set the sampling interval to be long, and it is more preferable to set the sampling interval by experience.

The vertical angle estimating unit 23 estimates the vertical angle of the radar 10 by using the maximum detection distance updated by the updating unit 22. In this case, the vertical angle estimating unit 23 may refer to mapping data prestoring the maximum detection distance by experience, or the vertical angle may be linearly changed. For example, the estimation angle may be determined based on experience that the radar 10 can perform detection up to 200 m when the vertical angle of the radar 10 is 0 degree, and the radar 10 can perform detection up to 150 m when the vertical angle of the radar 10 is shifted by 1 degree.

The determining unit 24 determines whether the vertical angle estimated by the vertical angle estimating unit 23 is in the preset required mount angle range. When the vertical angle is in the preset required mount angle range, the determining unit 24 determines the vertical angle of the radar 10 as being in a normal state, and when the vertical angle is out of the preset mount request range, the determining unit 24 determines that the vertical angle abnormality occurs in the radar 10.

Therefore, it is possible to determine whether the vertical angle abnormality occurs in the radar 10 during traveling, thus obtaining accurate vehicle-ahead information from the radar 10 and stably controlling the driving of the vehicle based on the accurate vehicle-ahead information.

A driver convenience system, that is, an adaptive cruise control system to which the present invention is applied is described below which performs autonomous driving while automatically maintaining a preset distance from vehicles ahead.

Figure 2:
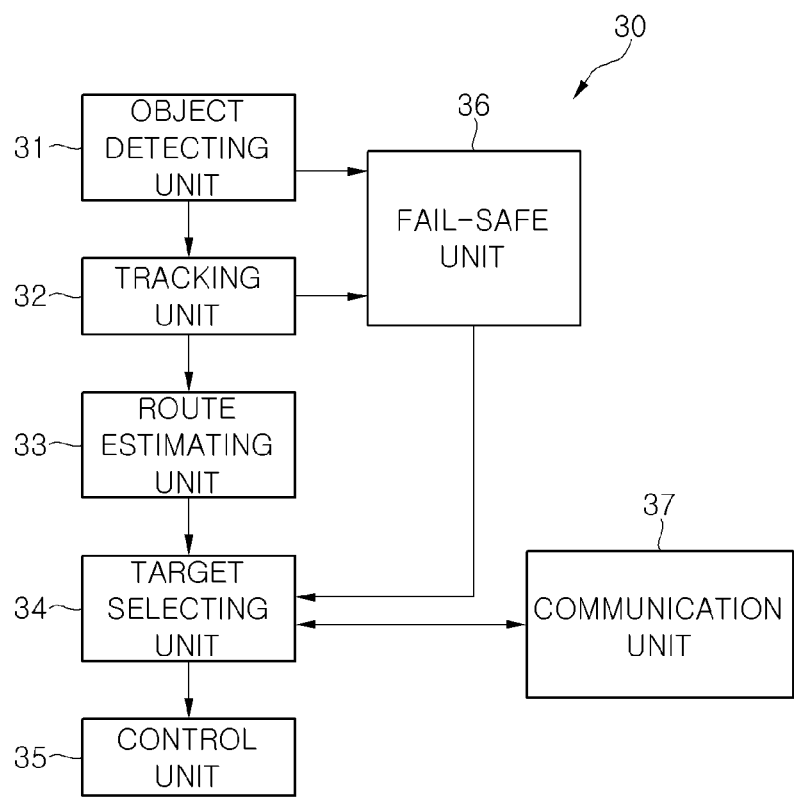
FIG. 2 is a block diagram explaining a driver convenience system according to another embodiment of the present invention.

FIG. 2 illustrates a block diagram explaining a driver convenience system according to another embodiment of the present invention.

Referring to FIG. 2, the driver convenience system 30 according to the another embodiment of the present invention includes an object detecting unit 31, a tracking unit 32, a route estimating unit 33, a target selecting unit 34, a control unit 35, a fail-safe unit 36, and a communication unit 37.

The object detecting unit 31 is the above-described radar and is hereinafter referred to as a radar. The radar 10 detects vehicle-ahead information associated with a preceding object that is located in front of a host vehicle, that is, a relative distance, a relative speed, and the like between a host vehicle and a preceding object.

The tracking unit 32 continuously tracks the preceding object detected by the radar 10. The route estimating unit 33 estimates a route along which the host vehicle is traveling. The target selecting unit 34 selects a target located on the estimated route.

The control unit 35 generates an acceleration/deceleration control signal for controlling acceleration/deceleration of the host vehicle so as to maintain a preset distance or an inter-vehicle distance from the target selected by the target selecting unit 34 and provides the acceleration/deceleration control signal to an engine unit (not illustrated) or a braking unit (not illustrated).

When the control unit 35 receives a vertical angle abnormality signal indicating the vertical angle abnormality of the radar 10 from the fail-safe unit 36 which will be described below, as a result of the determination, the control unit 35 may output the vertical angle abnormality signal to at least one of a screen of a terminal mounted on the vehicle and a cluster, and furthermore, perform control to stop autonomous driving. Therefore, a driver can easily recognize the vertical angle abnormality of the radar 10 during traveling and rapidly take action accordingly.

The fail-safe unit 3 includes the monitoring unit 21, the updating unit 22, the vertical angle estimating unit 23, and the determining unit 24 of the above-described electronic control unit 20.

That is, the fail-safe unit 36 monitors a stationary object based on vehicle-ahead information detected by the radar 10, and estimates a vertical angle of the radar 10 by using a maximum detection distance between a vehicle and a stationary object of the received vehicle-ahead information. When the estimated vertical angle of the radar 10 is out of a preset required mount angle, the fail-safe unit 36 determines whether a vertical angle abnormality occurs in the radar 10 and provides a vertical angle abnormality signal indicating the vertical angle abnormality of the radar 10 to the control unit 35 based on a result of the determination. The control unit 35 may perform control to stop autonomous driving of the vehicle, or may perform control to display abnormality notification through a speaker or a cluster based on the vertical angle abnormality signal received from the fail-safe unit 36.

The communication unit 37 may receive a control signal from a sensor, a braking unit, a suspension unit, a steering unit, or the like, or transfer a control signal from the control unit 35 to the braking unit, the suspension unit, the steering unit, or the like which is mounted on the vehicle.

A method for determining a vertical angle abnormality of a radar in the driver convenience system configured as described above will be described below.

Figure 3:
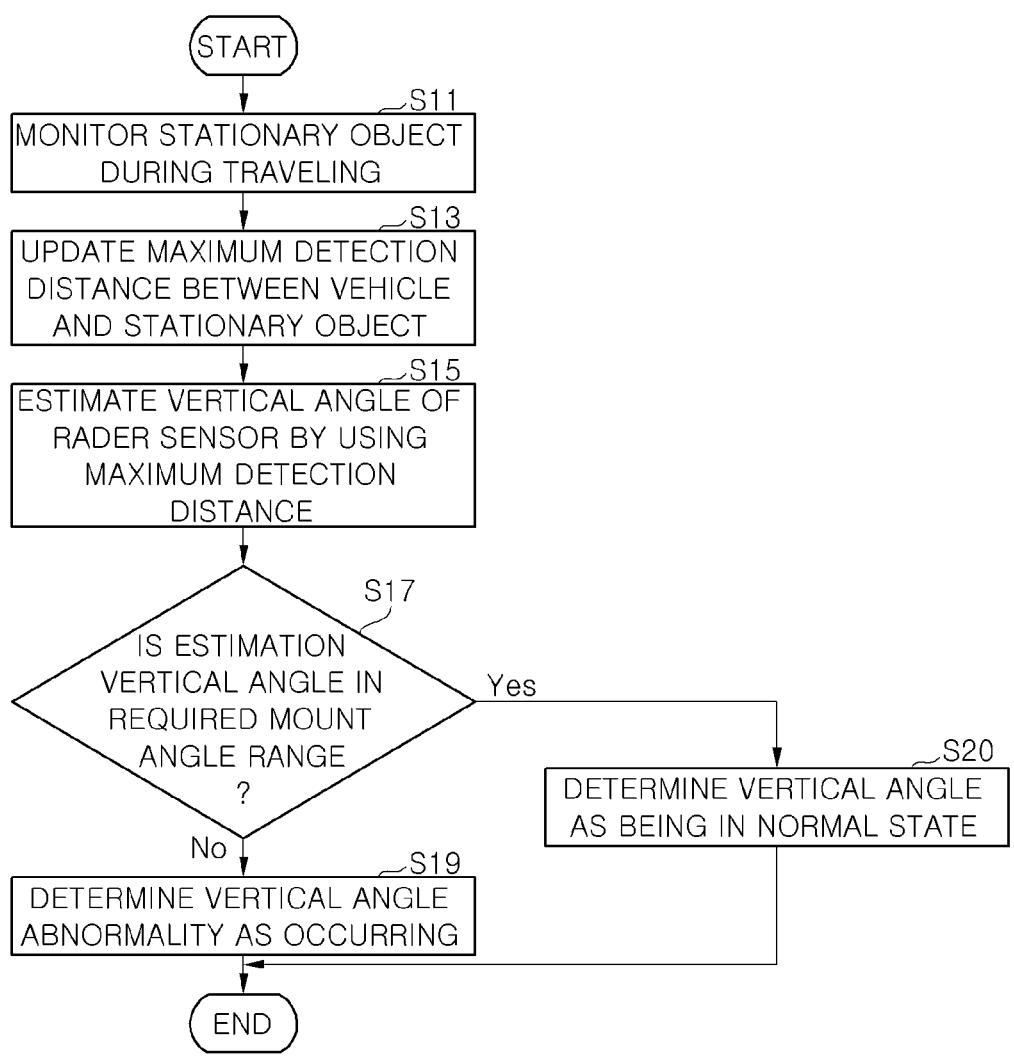
FIG. 3 is a flowchart explaining a method for determining a vertical angle abnormality of a radar in a driver convenience system, according to another embodiment of the present invention.

FIG. 3 is a flowchart explaining a method for determining a vertical angle abnormality of a radar in a driver convenience system according to another embodiment of the present invention.

Although the method for determining a vertical angle abnormality of a radar in the driver convenience system illustrated in FIG. 1 will be described with reference to FIG. 3, it is obvious that the process of the method is applicable to the driver convenience system illustrated in FIG. 2. The driver convenience system illustrated in FIG. 2 is different from the driver convenience system illustrated in FIG. 1 in that the fail-safe unit 36 performs the function of the electronic control unit 20 and the control signal generated based on the result of the determination in the fail-safe unit 36, for example, a vertical angle abnormality signal or a vertical angle normality signal is transferred to the control unit 35.

Referring to FIG. 3, the electronic control unit 20 receives vehicle-ahead information detected by the radar 10 during traveling and monitors a stationary object by classifying attributes of the received vehicle-ahead information (S11).

The electronic control unit 20 updates a maximum detection distance of detection distances between a vehicle and the stationary object, which are included in the received vehicle-ahead information (S13). In this case, the electronic control unit 20 sets a sampling interval according to the number of stationary objects and maintains a standby state until the arrival of the set sampling interval.

After step S13, the electronic control unit 20 may further perform the step of setting the sampling interval and the step of determining whether the set sampling interval arrives. That is, the electronic control unit performs the step of setting the sampling interval and the step of determining whether the set sampling interval arrives after step S13 or before step S15 which is described below, thereby increasing reliability in the maximum detection distance between the vehicle and the stationary vehicle by using the sampling interval which is sensitively set according to the number of stationary objects.

The electronic control unit 20 estimates the vertical angle of the radar 10 by using the maximum detection distance updated in step S13 (S15). The estimation angle according to the maximum detection distance may be determined based on mapping data prestoring an estimation angle with respect to each maximum detection distance by experience, or the estimation angle may be determined linearly.

The electronic control unit 20 determines whether the estimation vertical angle is in a required mount angle range by comparing a preset required mount angle with the vertical angle of the radar 10 estimated in step S17.

Figure 4A:
FIGS. 4A and 4B are examples of screens displaying a vertical angle normality and a vertical angle abnormality of a radar.
Figure 4B:

When it is determined that the estimation vertical angle is out of the required mount angle range in step S17, the electronic control unit 20 determines that a vertical angle abnormality occurs in the radar 10 (S19). In a radar 10 illustrated in FIG. 4B, the vertical angle abnormality is determined as occurring.

When it is determined that the vertical angle abnormality occurs in the radar 10, the electronic control unit 20 outputs abnormality notification information through at least one of a speaker, a screen of a terminal mounted on the vehicle, and a cluster. Although the abnormality notification information is described as being output through the speaker, the screen of the terminal, and the cluster mounted on the vehicle, a vertical angle abnormality signal indicating the vertical angle abnormality of the radar 10 may be output to the control unit (35 in FIG. 2) included in the driver convenience system and the control unit may temporarily stop, for example, autonomous driving or the like according to another embodiment.

When it is determined that the estimated vertical angle is in the required mount angle range in step S17, the electronic control unit 20 determines the vertical angle of the radar 10 as being in a normal state (S20). In a radar 10 illustrated in FIG. 4A, the vertical angle of the radar 10 is determined as being in a normal state.

Therefore, it is possible to determine whether a vertical angle abnormality occurs in the radar 10 during traveling without separately mounting an additional sensor, thus stably and accurately performing control on the driver convenience system.

According to the embodiments of the present invention, it is possible to determine whether a vertical angle abnormality occurs in a radar by using a vertical angle estimated based on a maximum detection distance between a stationary object and a vehicle in the vehicle-ahead information acquired by performing monitoring ahead of a vehicle from a radar sensor, and a preset required mount angle range.

Furthermore, according to the embodiments of the present invention, it is possible to increase in reliability in the maximum detection distance between the stationary object and the vehicle by setting a sampling interval at which whether a vertical angle abnormality in the radar is performed according to the number of stationary objects.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: radar | 20: electronic control unit |
| 21: monitoring unit | 22: updating unit |
| 23: vertical angle estimating unit | 24: determining unit |
| 30: driver convenience system | 31: object detecting unit |
| 32: tracking unit | 33: route estimating unit |
| 34: target selecting unit | 35: control unit |
| 36: fail-safe unit | 37: communication unit |

What is claimed is:

1. A driver convenience system comprising:
   a radar which is mounted on a vehicle to detect vehicle-ahead information; and
   an electronic control unit which controls driving of the vehicle based on the vehicle-ahead information detected by the radar,
   wherein the electronic control unit includes:
   a monitoring unit configured to monitor a stationary object based on the vehicle-ahead information detected by the radar;
   an updating unit configured to update a maximum detection distance between the stationary object monitored by the monitoring unit and the vehicle;
   a vertical angle estimating unit configured to estimate a vertical angle of the radar by using the maximum detection distance updated by the updating unit; and
   a determining unit configured to determine that a vertical angle abnormality occurs in the radar when the estimated vertical angle is out of a preset required mount angle,
   wherein the vertical angle estimating unit estimates the vertical angle of the radar by referring to mapping data storing an estimation angle defined with respect to each maximum detection distance.

2. The driver convenience system according to claim 1, wherein the updating unit sets a sampling interval at which whether the vertical angle abnormality occurs in the radar is determined based on the number of stationary objects, and provides the updated maximum detection distance to the vertical angle estimating unit at the time of arrival of the set sampling interval.

3. The driver convenience system according to claim 1, wherein when it is determined that the vertical angle abnormality occurs in the radar, the determining unit outputs notification information indicating the vertical angle abnormality through at least one of a speaker mounted on the vehicle, a screen of a terminal mounted on the vehicle, and a cluster.

4. A driver convenience system, which includes a radar which is mounted on a vehicle to detect vehicle-ahead information and a control unit which controls autonomous driving of the vehicle based on the vehicle-ahead information detected by the radar, the driver convenience system comprising:
   a fail-safe unit configured to classify attributes of the vehicle-ahead information detected by the radar, update a maximum detection distance between a stationary object and the vehicle, and determine that a vertical angle abnormality occurs in the radar when a vertical angle of the radar which is estimated by using the updated maximum detection distance is out of a preset required mount angle range, wherein the vertical angle estimating unit estimates the vertical angle of the radar by referring to mapping data storing an estimation angle defined with respect to each maximum detection distance.

5. The driver convenience system of claim 4, wherein the fail-safe unit outputs a vertical angle abnormality signal to the control unit, the vertical angle abnormality signal being generated based on a result of the determination that the vertical angle abnormality occurs in the radar.

6. A method for determining a vertical angle abnormality of a radar in a driver convenience system, which includes a radar which is mounted on a vehicle to detect vehicle-ahead information and an electronic control unit which controls driving of the vehicle based on the vehicle-ahead information detected by the radar, the method comprising:

monitoring a stationary object based on the vehicle-ahead information detected by the radar;

updating a maximum detection distance between the monitored stationary object and the vehicle;

estimating a vertical angle of the radar by using the updated maximum detection distance; and determining that the vertical angle abnormality occurs in the radar when the estimated vertical angle is out of a preset required mount angle, wherein the vertical angle estimating unit estimates the vertical angle of the radar by referring to mapping data storing an estimation angle defined with respect to each maximum detection distance.

7. The method of claim 6, further comprising, after the monitoring of the stationary object:

setting a sampling interval at which whether the vertical angle abnormality of the radar occurs in the radar is determined based on the number of stationary objects; and providing the updated maximum detection distance to be used in the estimating of the vertical angle at the time of arrival of the set sampling interval.

8. A method for determining a vertical angle abnormality of a radar in a driver convenience system, which includes a radar which is mounted on a vehicle to detect vehicle-ahead information and a control unit which controls driving of the vehicle based on the vehicle-ahead information detected by the radar, the method comprising:

classifying attributes of vehicle-ahead information detected by the radar and updating a maximum detection distance between a stationary object and the vehicle;

estimating a vertical angle of the radar by using the updated maximum detection distance; and determining that the vertical angle abnormality occurs in the radar when the estimated vertical angle is out of a preset required mount angle, wherein the vertical angle estimating unit estimates the vertical angle of the radar by referring to mapping data storing an estimation angle defined with respect to each maximum detection distance.

9. The method of claim 8, further comprising, after the determining of the vertical angle abnormality, outputting a vertical angle abnormality signal generated based on a result of the determination that the vertical angle abnormality occurs in the radar to the control unit.

* * * * *